US008668183B2

(12) United States Patent
Haseloh et al.

(10) Patent No.: US 8,668,183 B2
(45) Date of Patent: Mar. 11, 2014

(54) DUAL-DIRECTION IN-TANK MAGNETIC SAFETY VALVE

(76) Inventors: Peter G. Haseloh, Kindersley (CA); Kirste Ann Manuel, Dartmouth (CA)

(*) Notice: Subject to any disclaimer, the term of this patent is extended or adjusted under 35 U.S.C. 154(b) by 224 days.

(21) Appl. No.: 13/432,338

(22) Filed: Mar. 28, 2012

(65) Prior Publication Data

US 2012/0248348 A1    Oct. 4, 2012

Related U.S. Application Data

(60) Provisional application No. 61/468,966, filed on Mar. 29, 2011.

(51) Int. Cl.
*F16K 31/08*    (2006.01)
(52) U.S. Cl.
USPC .............................. 251/65; 137/526; 137/907
(58) Field of Classification Search
CPC .......... F16K 1/30; F16K 1/301; F16K 1/302; F16K 1/304; F16K 15/18; F16K 31/06; F16K 31/08; F16K 31/084; F16K 31/0655
USPC ............................. 137/907, 526, 524; 251/65
See application file for complete search history.

(56) References Cited

U.S. PATENT DOCUMENTS

| | | | | |
|---|---|---|---|---|
| 2,569,316 A | * | 9/1951 | Jerman | 137/517 |
| 2,646,071 A | * | 7/1953 | Wagner | 137/528 |
| 2,667,895 A | * | 2/1954 | Pool et al. | 137/528 |
| 3,495,620 A | * | 2/1970 | Seymour et al. | 137/529 |
| 5,280,806 A | * | 1/1994 | Glazebrook | 137/517 |
| 5,996,563 A | * | 12/1999 | Liao | 123/587 |
| 7,255,323 B1 | | 8/2007 | Kadhim | |

FOREIGN PATENT DOCUMENTS

| | | |
|---|---|---|
| DE | 29704221 U1 | 5/1997 |
| EP | 1096188 A2 | 5/2001 |
| GB | 2416822 A | 2/2006 |
| JP | 3107679 A | 5/1991 |

OTHER PUBLICATIONS

Extended European Search Report (Jun. 22, 2012) re EP 12161832.6.
Amendment and Response (dated Mar. 28, 2013) to Extended European Search Report (Jun. 22, 2012) re EP 12161832.6.

* cited by examiner

*Primary Examiner* — Eric Keasel
*Assistant Examiner* — David Colon Morales
(74) *Attorney, Agent, or Firm* — Donald V. Tomkins

(57) ABSTRACT

A magnetic safety valve for installation through a tank wall incorporates a piston movable within a valve body. The valve is held normally-closed by two opposite-pole magnets, one in the inner end of the piston, and one in the valve body. A vacuum produced by a pump connected to the valve will act upon the outer end of the piston, producing a force tending to move the piston outward. When the vacuum-induced outward force on the piston exceeds the attractive force between the two magnets, it pulls the piston outward and away from the valve body magnet, unseating the inner end of the piston from the valve body, and allowing outward fluid flow through the valve. A second valve seat may be provided for engagement with an outer portion of the piston to prevent uncontrolled fluid flow out of the tank in the event of valve damage.

11 Claims, 3 Drawing Sheets

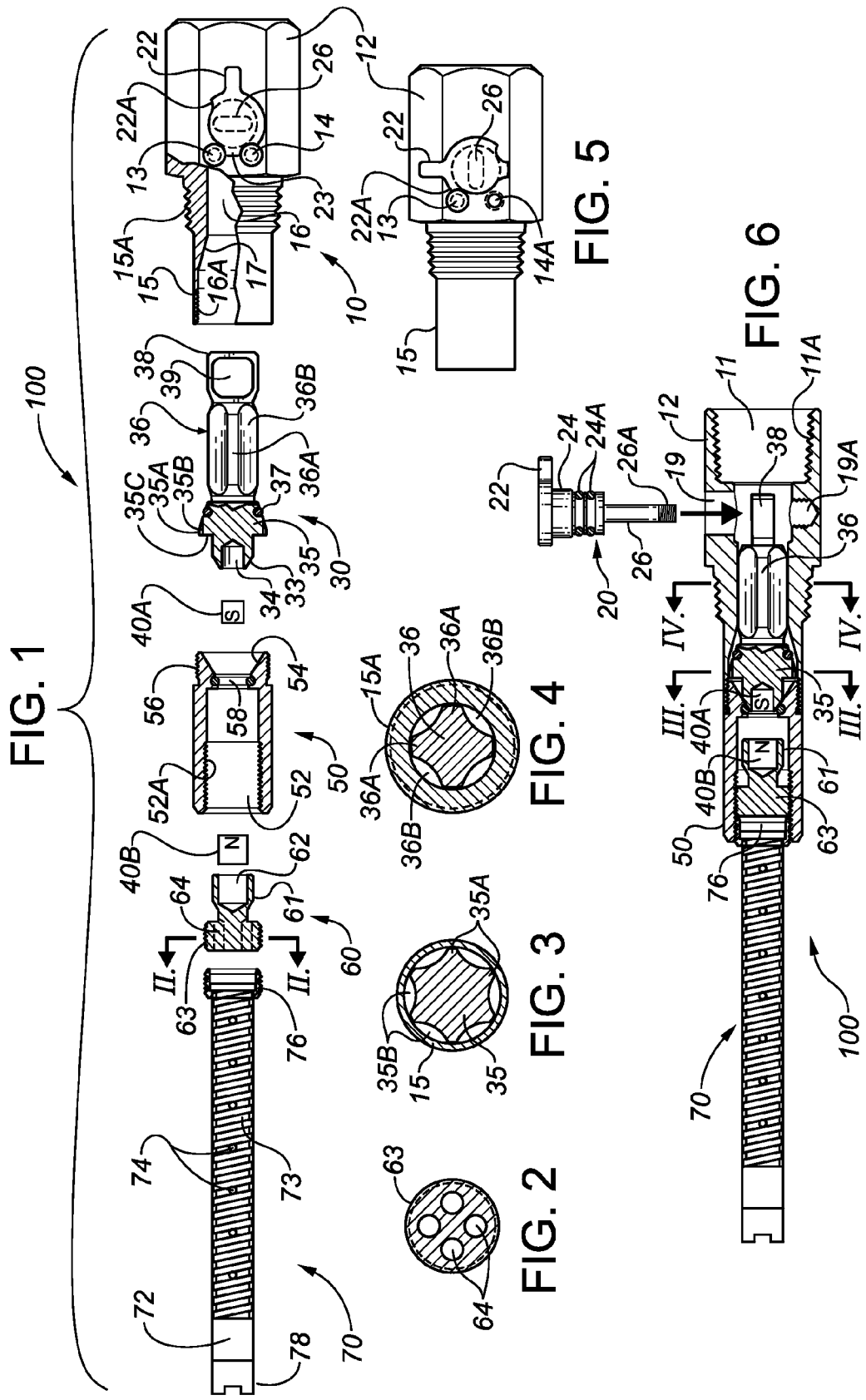

DUAL-DIRECTION IN-TANK MAGNETIC SAFETY VALVE

CROSS-REFERENCE TO RELATED APPLICATIONS

This application claims the benefit, pursuant to 35 U.S.C. 119(e), of U.S. Patent Application No. 61/468,966, filed Mar. 29, 2011, and said earlier application is incorporated herein by reference in its entirety for continuity of disclosure.

FIELD OF THE DISCLOSURE

The present disclosure relates in general to valves for regulating flow from fluid storage tanks, and in particular to valves adapted to close in the event of significant physical damage.

BACKGROUND

A need exists for the prevention of uncontrolled flow of fluids from storage tanks to the environment as a result of piping breaches, equipment failures, or acts of vandalism. This is the case for tanks used to store many different types of fluids, including various chemicals, acids, and fuel oils, to name only a few. One common example is a storage tank containing fuel oil for an oil-fired furnace in an adjacent house or other building.

To access the contents of such storage tanks, a manual shut-off valve is typically installed at the bottom of the tank, and piping is run from this valve to a pump for feeding the stored fluid to a furnace or other appliance. There have been many instances where piping from such valves has been sheared off either accidentally or deliberately. In recent years, deliberate damage to fuel oil shut-off valves has become a particular problem in some areas due to theft of the high-value copper tubing running from the fuel storage tank to the furnace. In some cases, even the manual shut-off valve itself can be either broken off or damaged to the point that all of the fluid flows out of the tank. Equipment failure, whether caused by a structural break or a seal failure, can also result in uncontrolled flow of fluid out of the tank into the environment. Such incidents can have drastic and severe environmental impacts costing very large amounts of money to rectify or remediate.

BRIEF SUMMARY

The present disclosure teaches a magnetic safety valve which when installed through the wall of a storage tank is disposed entirely inside the tank except for an external valve stem (i.e., valve operator). The valve incorporates a piston that is movable within the valve body, and a preset pressure differential is required across the piston to activate or open the valve. The valve is held in a normally-closed position by two opposite-pole magnets, one incorporated into the inner end of the piston (also referred to as the piston magnet), and one incorporated into the valve body (also referred to as the valve body magnet), and in sufficiently close proximity so as to be magnetically attracted to each other. In preferred embodiments, the position of the valve body magnet relative to the valve body is longitudinally adjustable, such that the magnetic force between the two magnets when the valve is closed (i.e., corresponding to the minimum valve-opening force or cracking pressure) can be adjusted. In alternative embodiments, however, the valve body magnet could be in a fixed position relative to the valve body, such that the valve will have a fixed cracking pressure.

Upon start-up, the fluid feed pump (or other connected appliance) will produce a vacuum, which acts upon the outer end of the piston, producing a suction force tending to pull the piston outward (i.e., toward the exterior of the tank) away from the valve body magnet. When the vacuum builds up to a value (the "cracking pressure") at which the outward force on the piston exceeds the magnetic force between the two magnets, it pulls the piston outward and away from the valve body magnet, thus unseating the inner end of the piston from its seat within the valve body, and allowing fluid flow outward through the valve. The movement of the piston reduces the magnetic force attracting the two magnets to each other, but a residual attractive force remains.

When the pump (or appliance) is shut off, the vacuum drops in the piping between the valve and the pump (or appliance), such that the residual attractive force between the magnets exceeds the outward force (if any) acting on the piston. As a result, the piston is drawn inward toward the valve body magnet, until it engages the rear seat and thus returns the valve to the normally-closed position, stopping the flow of fluid.

Siphoning is another way that can cause uncontrolled fluid flow out of a tank. If a tank is placed above ground and if the piping from the tank extends down to a surface or appliance at a lower elevation, a liquid column exists. This liquid column in the piping presents an additional potential hazard. If the piping is sheared off at the appliance, the liquid column flows out of the piping, resulting in creation of a vacuum, which will open the valve. This problem is addressed in one embodiment of the disclosed valve by providing a second (or outer) valve seat in the valve body for engagement by the outer end of the piston. Because the outward fluid flow in this scenario is uncontrolled (i.e., much more than what is usually called for by the appliance or pump), this creates a large pressure differential across the rear and front of the piston head. Thus the excess flow pushes against a flat surface on the backside of the piston. This differential pressure and fast liquid flow causes the piston to shuttle forward and engage the second (outer) valve seat. This feature may be alternatively referred to as the valve's excess flow prevention feature.

The in-tank magnetic safety valve also incorporates means for mechanically opening the valve, to provide a means of bleeding air from the system when it is initially installed. The mechanical valve-opening means is also used to push the piston rearwards if the excess flow prevention feature of the valve has been activated. After this is done, the valve is returned to the activated position, and a safety locking mechanism for the normally-closed position is engaged.

The in-tank magnetic safety valve is also designed in such a way that should the valve itself be sheared off flush to the tank structure it will still prevent uncontrolled flow of fluid from the tank. This is due to the valve seat (or seats) and magnets being positioned inside the tank structure. As the magnets hold the valve in a normally-closed position and are protected from damage, the loss of fluid from the tank is prevented. The addition of the excess flow prevention feature of the valve may also be employed in this condition. As the valve is being sheared off, the piston is dragged forward by the departing piece before breaking the front of the piston off. This action engages the outer O-ring seal on the piston against the tapered outer valve seat in the main body, shutting off fluid flow.

The in-tank magnetic safety valve of the present disclosure accommodates any damage or irregularity between the in-tank magnetic safety valve and the source of vacuum, whether due to a piping break, filter damage, manual valve failure, or other cause. Because the valve requires a vacuum to open, any leakage caused by damage between the valve and the pump will result in a loss of vacuum. This loss of vacuum will cause the valve to revert to its normally-closed position or will prevent it from being activated at all. If a failure occurs at the lowest point in the system and the liquid column drains out, this causes a rapid change in differential pressure across the valve piston. This in turn causes the piston to move outward and contact the outer valve seat in the main body, thus sealing off the flow from the tank.

The in-tank magnetic safety valve also incorporates means for adjusting the spatial relationship between the magnets. The height of the fluid column will determine the final setting of the spatial relationship of the magnets; i.e., a tall tank will have a higher head pressure than a short tank. One of the magnets in the valve is installed inside an externally threaded holder. The rear of the valve body has internal threads that this magnet holder screws into. By screwing this magnet holder in or out, the spatial distance relationship between the magnets can be changed. By bringing the magnets closer together, magnetic attraction is increased and the valve will be able to hold back higher head pressures (as would be in the case for taller tanks). In the case of a shorter tank, the magnets are adjusted away from each other, thereby reducing magnetic attraction between them.

If installed in the bottom of a tank, the valve is adjusted until it will hold back a pressure equal to at least 150% of the fluid column acting against the smaller (inner) end of the piston in the valve. This reduces the amount of vacuum build-up that the pump or appliance needs to exert against the larger (outer) side of the piston in order to open the valve.

The valve can also be installed into the top wall of a tank with a drop tube installed onto the inner end of the valve and extending downward within the tank to a selected distance (for example, but not limited to, about 1.5 inches) above the bottom of the tank. This is done so that the valve, when activated, will not draw debris and or water off the bottom of the tank. The drop tube acts as a stilling well, and any debris drawn up by the vacuum will typically drop out of the fluid column and therefore will not be drawn into the valve. The vacuum set point for a top-mounted valve will typically be set much lower than it would be for a bottom-mount situation, because a top-mounted valve does not have to hold back a fluid head. Typically, a top-mounted valve will be set to open at a vacuum of about 1" of mercury (Hg).

In this patent document, the adjectives "inner", "inward", "outer", and "outward", as used with reference to various components, are to be understood relative to a tank in which a valve in accordance with the disclosure has been or is to be mounted. For example, the inner end of the piston would be disposed further toward the interior of the tank than the outer end of the piston (which would be closer to the tank wall).

BRIEF DESCRIPTION OF THE DRAWINGS

Embodiments within the scope of the present disclosure will now be described with reference to the accompanying figures, in which numerical references denote like parts, and in which:

FIG. 1 is an exploded view of the components of one embodiment of a magnetic safety valve in accordance with the present disclosure.

FIG. 2 is a cross-section through the valve body magnet holder of the assembled valve shown in FIG. 6.

FIG. 3 is a cross-section through the inner end of the piston of the assembled valve shown in FIG. 6.

FIG. 4 is a cross-section through the main body of the piston of the assembled valve shown in FIG. 6.

FIG. 5 is a view of the outer section of the valve body illustrating the position of the valve stem after actuation to mechanically open the valve.

FIG. 6 is a cross-section through a magnetic safety valve assembled from the components illustrated in FIG. 1.

DETAILED DESCRIPTION

Figure 7A:
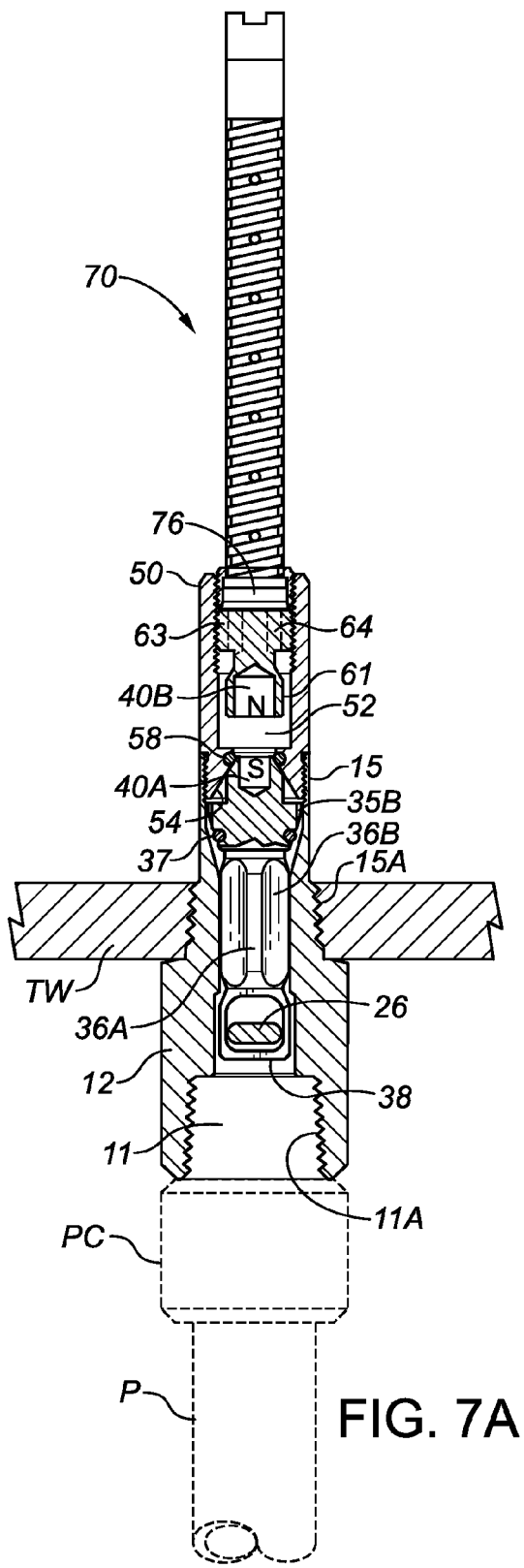
FIG. 7A is a cross-section through a magnetic safety valve as in FIG. 6, installed in a bottom wall of a fluid storage tank, showing the valve in its normally-closed position.

The accompanying Figures illustrate one non-limiting embodiment of a magnetic safety valve 100 in accordance with the present disclosure. Valve 100 includes a main valve body comprising an outer valve body 10 and an inner valve body 50. Outer valve body 10 has an outer section 12 and an inner section 15, with inner section 15 having an externally threaded section 15A for mounting valve 100 in an opening through the wall of a storage tank. A bore 11 extends through outer valve body 10, and an outer region of bore 11 is adapted (such as by internal threading 11A as illustrated) to facilitate connection to piping P leading to a pump or other appliance. A transverse bore 19 is provided through the wall of outer section 12 of outer valve body 10 for receiving a valve actuating assembly 20.

In the illustrated embodiment, valve actuating assembly 20 comprises an actuating handle 22 connected to a cylindrical shank 24 rotatably disposable within transverse bore 19, in conjunction with O-rings 24A or other suitable seal means. Extending from shank 24 is a valve stem 26 having a relatively flat and generally rectangular cross-section, plus a threaded cylindrical lower end 26A which is received in a threaded pocket 19A provided in bore 11 opposite transverse bore 19 as see in FIG. 6. Valve actuating assembly 20 preferably incorporates security means to prevent or deter accidental or maliciously intentional actuation of valve 100. The illustrated embodiment provides such security means by forming handle 22 to include a locking lug 23 which, when valve 100 is in its normally-closed position, will be disposed between a stop member 13 fixed to outer section 12 of outer valve body 10, and a locking screw 14 removably secured in a receiving hole 14A in outer section 12 of outer valve body 10. Preferably, removable locking screw 14 will be configured to require a special tool for removal. As most clearly seen in FIG. 1, handle 22 is preferably formed with an abutment 22A for abutting stop member 13 to prevent over-rotation of valve stem 26 when valve 100 is being manually opened.

As best seen in FIG. 1, an inner portion of bore 16 within inner section 15 of outer valve body 10 has an internally-threaded region 16A for engagement with mating threads on inner valve body 50 (as will be described later herein). Outboard of threaded region 16A, bore 16 defines a frustoconical valve seat 17 decreasing in diameter as it progresses outward.

Valve 100 further includes a piston assembly 30 comprising an inner piston section 35 and a camming member 38 separated by a contiguous central piston section 36. Inner section 35 of piston assembly 30 is formed with an inner tip segment defining a magnet pocket 34 for receiving a piston magnet 40A, plus an adjacent frustoconical sealing surface 33 increasing in diameter as it progresses outward. The segment of inner piston section 35 outward of the inner tip segment has an inward-oriented annular surface 35C surrounding the inner tip segment, plus a generally frustoconical perimeter surface 35A which decreases in diameter toward central piston section 36. Grooves 35B or openings of other suitable shape are formed in perimeter surface 35A to permit fluid flow. Perimeter surface 35A is also formed to receive an O-ring 37 or other suitable seal means.

Central piston section 36 is generally cylindrical in the illustrated embodiment, with one or more longitudinal grooves 36B being formed in its perimeter surface (to permit outward flow of fluid exiting grooves 35B in inner section 35 of piston assembly 30), with ribs 36A thus being formed between adjacent grooves 36B. Central piston section 36 is not restricted to the illustrated configuration, as persons skilled in the art will appreciate that piston sections of different configurations but functionally equivalent to central piston section 36 may be readily devised without special knowledge or skill.

Figure 7B:
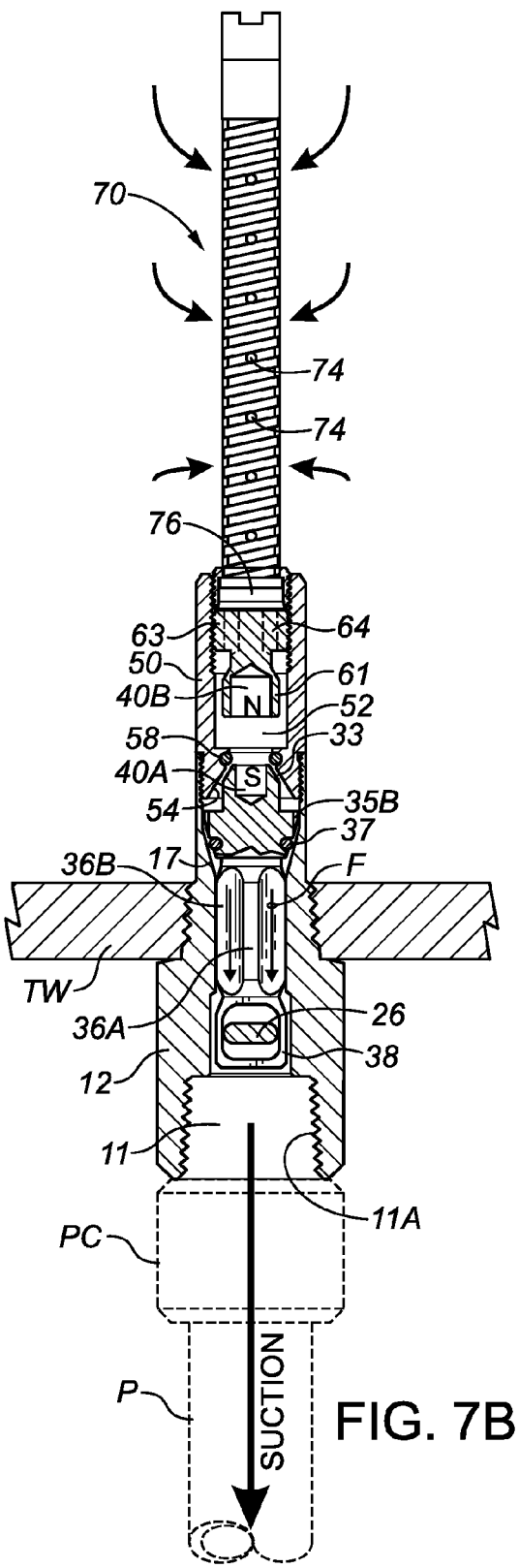
FIG. 7B is a cross-section through a magnetic safety valve as in FIG. 7A, showing the valve in an open position resulting from outward movement of the piston in response to a suction force acting on the piston.

In the embodiment shown in the Figures, camming member 38 has a generally rectilinear (and typically but not necessarily square) opening 39, for receiving valve stem 26. As best appreciated with reference to FIGS. 7A, 7B, and 7C, the dimensions of valve stem opening 39 in camming member 38 are such that camming member 38 can move longitudinally relative to valve stem 26 (within a range of travel determined by the longitudinal dimension of valve stem opening 39) when valve stem 26 is oriented transverse to the direction of flow through the valve (i.e., when in its normal operating position as shown in FIGS. 1, 7A, and 7B). However, rotation of valve stem 26 (by corresponding rotation of valve stem handle 22, as shown in FIG. 5) will cause valve stem 26 to engage camming member 38 so as to cause outward movement of piston assembly 30, as may be seen in FIG. 7C.

Inner valve body 50 is a generally cylindrical sleeve having an externally-threaded outer end 56, for mating engagement with internally-threaded region 16A of inner section 15 of outer valve body 10 (after insertion of piston assembly 30 within bore 16 of outer valve body 10). Inner valve body 50 has a through-bore 52, an inner end region 52A of which is internally threaded, and an outer region of which defines a frustoconical valve seat 54 increasing in diameter as it progresses outward. Through-bore 52 is formed to receive an O-ring 58 or other suitable seal means near the inner end of valve seat 54.

Valve 100 also includes an inner magnet holder 60 comprising an outer section 61 defining a magnet pocket 62 for receiving a valve body magnet 40B (the polarity of which is opposite to that of piston magnet 40A), plus an externally-threaded inner section 63 having one or more longitudinally-oriented flow channels 64. The number, size, and configuration of flow channels 64 will be a design choice to suit desired flow rates. Threaded inner section 63, with valve body magnet disposed within magnet pocket 62, may be screwed into threaded inner end region 52A of inner valve body 50.

In the illustrated embodiment, flow channels 64 are shown as round holes, which can also be engaged by a suitable tool to rotate inner magnet holder 60 within inner valve body 50 to adjust the longitudinal position of valve body magnet 40B relative to inner valve body 50, and thereby to adjust the intensity of the magnetic attractive force acting between piston magnet 40A and valve body magnet 40B for a given longitudinal position of piston magnet 40A relative to inner valve body 50. This enables valve 100 to accommodate different head pressures in the tank; i.e., inner magnet holder 60 may be screwed closer to piston 30 to account for higher pressures, or screwed away from piston 30 for lower pressures. Persons skilled in the art will readily appreciate, however, that this functionality can alternatively be provided by means other than the above-described threaded engagement of inner magnet holder 60 and inner valve body 50 (for example, ring retainers, press-fits, etc.).

In the illustrated embodiment, valve 100 includes a filter element 70, comprising a fluid inlet tube 72 having an inner end 78 and a plurality of orifices 74 to permit fluid flow into inlet tube 72, with inlet tube 72 being wrapped with a fine-mesh screen 73 to prevent entry of large particulate matter or debris into valve 100, as this may cause piston 30 to stick in the open or closed position. Filter element 70 is preferably designed to be a low-maintenance, full-flow type of filter. Screen 73 is preferably a 100 mesh screen, which will only allow particle sizes through that will not bind between the piston and bore 16 of outer valve body 10. Filter element 70 is preferably designed to provide full flow capabilities, even if 90% of screen 73 is plugged. Filter element 70 has an externally-threaded end 76 for engagement with internally-threaded region 52A of inner valve body 50 (after insertion of inner magnet holder 60 into inner valve body 50). In preferred embodiments, threaded end 76 of filter element 70 butts up against inner magnet holder 60 and locks it in place to retain the valve's magnetic pulling-force settings. However, many different types of filter media and retaining methods may alternatively be used to achieve desired results.

Filter element 70 will not be required in cases where valve 100 is mounted into the top wall of a fluid storage tank, using a drop tube to draw fluid into the valve from a lower region of the tank. In such installations, the drop tube may be fitted with a suitable threaded fitting for engagement with internally-threaded region 52A of inner valve body 50 (or the assembly may be adapted for other means of connecting the drop tube).

In one embodiment of valve 100, outer valve body 10 has ½" (12.7 mm) NPT male threading (15A) and female threading (11A), but this is by way of example only. Valve 100 can be smaller or larger as specific conditions may dictate, and can incorporate any type of threading or alternative mounting or attachment system (e.g., flanged connections).

Outer valve body 10 is preferably constructed from a corrosion-resistant metal. However, alternative materials including but not limited to different metals and plastics may be used without departing from the scope of the present disclosure.

Figure 7C:
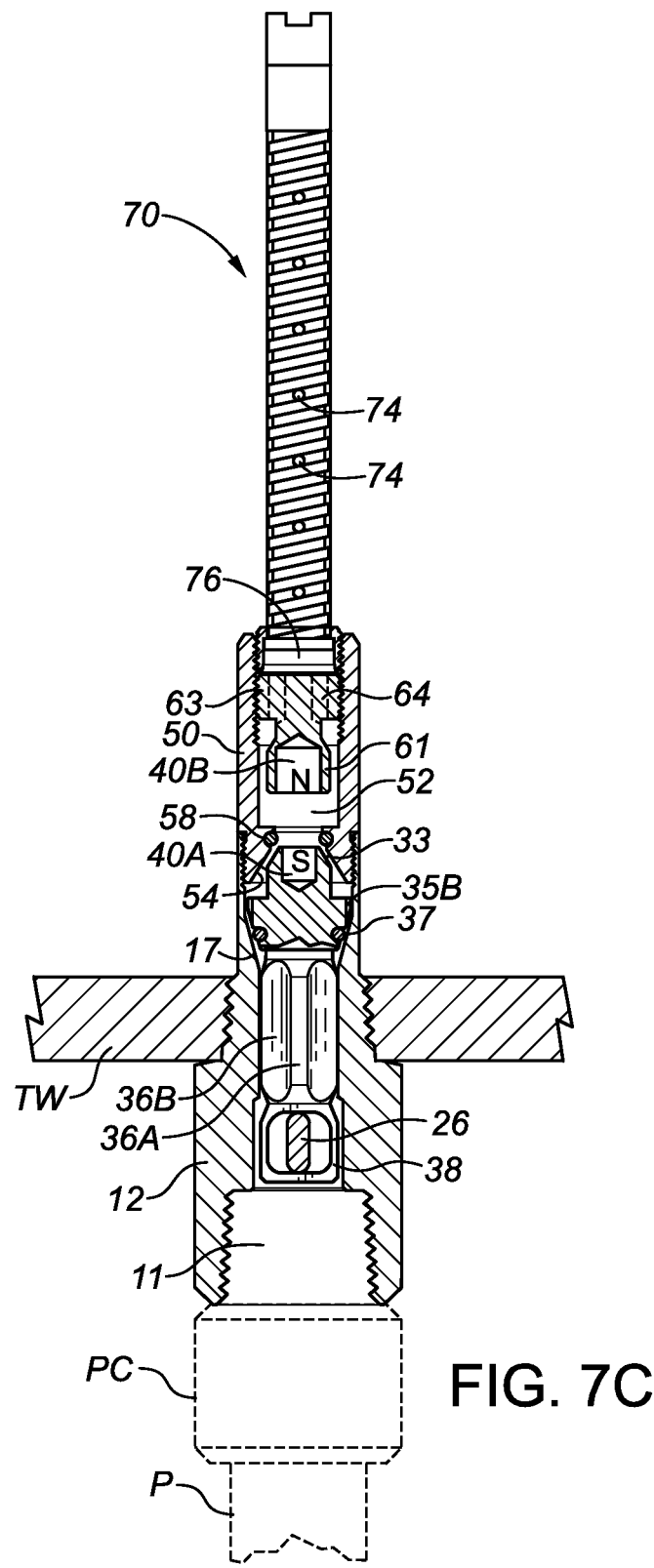
FIG. 7C is a cross-section through a magnetic safety valve as in FIG. 7A, showing the valve in an open position resulting from actuation of the valve stem into the position illustrated in FIG. 5.

The operation of valve 100 may be readily understood with reference to FIGS. 7A, 7B, and 7C, which show valve 100 mounted in a tank wall TW, with piping P connected to outer section 12 of outer valve body 10 by means of a suitable piping connection PC. In FIG. 7A, valve 100 is in its normally-closed position by virtue of the attractive magnetic force acting between piston magnet 40A and valve body magnet 40B, with inner seal surface 33 on piston 30 in sealing engagement with O-ring 58 on frustoconical inner valve seat 54, thus preventing fluid flow through valve 100.

In FIG. 7B, a vacuum produced by a pump or other appliance connected to piping P acts on the piston 30 to produce an outward-acting force (represented by the "Suction" arrow) which pulls piston 30 outward and out of sealing engagement with inner valve seat 54, thus allowing fluid flow through valve 100, with fluid from inside the tank flowing into valve 100 via fluid inlet orifices 74 in filter element 70 (as represented by the curved flow arrows in FIG. 7B). Valve 100 is calibrated (such as by adjusting the longitudinal position of valve body magnet 40B) such that the vacuum force will draw piston 30 outwardly away from inner valve seat 54 so as to allow fluid flow therethrough, but not so far as to bring outer O-ring seal 37 on piston 30 into sealing engagement with outer valve seat 17 in outer valve body 10.

When valve 100 is open as shown in FIG. 7B, fluid entering valve 100 from filter element 70 flows, in sequence, through flow channels 64 in inner section 63 of inner magnet holder 60, through bore 52 in inner valve body 50, through flow grooves 35B in inner section 35 of piston assembly 30, through flow grooves 35B in central piston section 36, and finally outward through bore 16 in inner section 15 of outer valve body 10 into piping P.

The manual cam-actuated valve actuating assembly 20 provides means for mechanically opening valve 100 and allowing liquid to flow out of the tank. Locking screw 14 is removed from hole 14A in outer valve body 10, and valve stem 26 is rotated 90° counter-clockwise until abutment 22A on valve stem handle 22 comes to rest against stop member 13. As valve stem 26 is rotated, it engages camming member 38 so as to urge piston 30 outward as shown in FIG. 7C, disengaging seal surface 33 from O-ring seal 58, and thus allowing fluid flow through valve 100.

Valve actuating assembly 20 also provides means for reopening valve 100 when the excess flow prevention feature of the valve has been activated (i.e., when O-ring seal 37 on piston 30 has been forced by fluid pressure into sealing contact with valve seat 17 in outer valve body 10, thus preventing unrestricted fluid flow out of the tank). In that configuration of valve 100, valve stem 26 will be closely adjacent to the inner side of opening 39 of camming member 38, such that rotation of valve stem 26 by 90 degrees (as in FIGS. 5 and 7C) will push piston 30 inward and away from valve seat 17. This allows fluid to flow and brings magnets 40A and 40B back into closer proximity with each other. Rotating valve stem 26 back to the position shown in FIG. 1 then returns valve 100 to its magnetically normally-closed position as shown in FIG. 7A (i.e., with sealing surface 33 on the inner end of piston 30 in sealing engagement with O-ring 58 on inner valve body 50 and thus preventing fluid flow).

Opening valve 100 by means of valve actuating assembly 20 causes fluid to flow into the system and allows air to be bled out of the system. When all air is bled out of the system, valve stem handle 22 is rotated clockwise until locking lug 23 engages stop member 13. This allows piston 30 to be pulled inward by the magnetic force attracting piston magnet 40A to valve body magnet 40B, until sealing surface 33 engages O-ring 58 on valve seat 54. Locking screw 14 is then re-installed to ensure that valve 100 cannot be inadvertently opened.

It is to be understood that the present disclosure is not limited to valves incorporating valve actuating assemblies specifically as illustrated and described herein. Persons skilled in the art will appreciate that alternative valve actuating assemblies providing functionality substantially equivalent to that of the illustrated valve actuating assembly can be readily devised in accordance with known technology, and valves incorporating such alternative valve actuating assemblies are intended to be within the scope of the present disclosure.

The various O-rings or other seals incorporated into valve 100 may be made of a suitable material selected having regard to the nature of the liquid in the tank. In certain applications, these seals may be provided in the form of Viton® fluoroelastomer O-rings.

Piston 30 may be made from acetal homopolymer, a chemical- and oil-resistant plastic (commonly known commercially as Delrin®) that provides low friction and good impact resistance. However, persons skilled in the art will appreciate that piston 30 could alternatively be made from various other plastics or metals without departing from the present disclosure, with the selected material being dependent on the particular liquids to be contained.

The frustonically-tapered outer surface 35A on piston 30 is larger than tapered sealing surface 33 on the innermost end of piston 30, such that a smaller surface area is presented to the head pressure in the tank. The correspondingly larger end with tapered surface 35A (and correspondingly larger O-ring 37, relative to O-ring 58) is situated towards the vacuum or outer part of valve 100. The smaller inner end of piston 30 provides a small surface area for the head pressure from the liquid in the tank to react against. The larger outer piston surface 35A with O-ring 37 provides a comparatively large surface area for the vacuum from the pump to react against. This difference between the inner and outer piston areas reduces the amount of vacuum required to move piston 30 forward and to open valve 100 to fluid flow. This same difference in sizes assures that piston 30 will shuttle outward and that O-ring 37 will sealingly engage tapered surface 17 in the event of valve damage that might otherwise result in uncontrolled fluid flow out of the tank.

A shear point or weakened area is preferably provided at the juncture of central piston section 36 and camming member 38. This is provided so that if outer valve body 10 is sheared off at the tank wall TW, an outer portion of piston 30 will also shear off, but will leave the main portion of piston 30 intact. Thus valve 100 will still be able to magnetically close and or shuttle forward to stop the flow of liquid out of the tank.

Piston magnet 40A preferably comprises a plated rare earth (e.g., neodymium) magnet, but alternatively may comprise any other type of magnet providing suitable functionality. In the illustrated embodiment, piston magnet 40A is press fit into the magnet pocket 34 with the South pole of piston magnet 40A facing inward (toward inner valve body 50). It should be noted, however, that the present disclosure is not limited to the use of magnets to move piston 30; other known means such as mechanical springs may be used in lieu of magnets in alternative embodiments.

Inner magnet holder 60 is preferably (but not necessarily) made from acetal homopolymer (Delrin®).

Valve body magnet 40B preferably comprises a plated rare earth (e.g., neodymium) magnet, but alternatively may comprise any other type of magnet providing suitable functionality. However, this also will not limit the scope of the present disclosure, as a holder can be used in inner valve body 50 to vary the amount of force that a mechanical spring can exert against piston 30 to push it inward against valve seat 54 and the associated O-ring 58. Valve body magnet 40B is shown press-fit into the magnet pocket 62 of inner magnet holder 60 with the North pole of valve body magnet 40B facing outward toward piston 30. Thus the North pole of valve body magnet 40B attracts the South pole of piston magnet 40A. (The polarity of the magnets in the preceding discussion is of course arbitrary; in alternative arrangements, the South pole of valve body magnet 40B could attract the North pole of piston magnet 40A.)

It will be appreciated by persons skilled in the art that various modifications and alternative embodiments of magnetic safety valves may be devised without departing from the scope and teachings of the present disclosure, including modifications that may use equivalent structures or materials hereafter conceived or developed. It is to be especially understood that the disclosure is not intended to be limited to any particular described or illustrated embodiment, and that the substitution of a variant of a described or illustrated element or feature, without any substantial resultant change in functionality, will not constitute a departure from the scope of the disclosure. It is also to be appreciated that the different teachings of the embodiments described and illustrated herein may be employed separately or in any suitable combination to produce desired results.

In this document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure. Relational terms such as "parallel", "perpendicular", "flat", "coincident", "intersecting", and "equidistant" are not intended to denote or require absolute mathematical or geometrical precision. Accordingly, such terms are to be understood as denoting or requiring substantial precision only (e.g., "substantially parallel") unless the context clearly requires otherwise.

What is claimed is:

1. A valve assembly comprising:
   (a) a main valve body comprising an outer valve body and an inner valve body and having a longitudinal bore, wherein:
      a.1 the outer valve body has an inner section and an outer section, said inner section of the outer valve body being adapted for mounting in an opening through a tank wall such that said outer section of the outer valve body will be external to the tank wall;
      a.2 the outer section of the outer valve body has an outer end adapted for connection to a source of vacuum; and
      a.3 the bore of the main valve body defines an inner valve seat in the inner valve body and an outer valve seat in the inner section of the outer valve body;
   (b) a piston longitudinally movable within the bore of the main valve body and having an inner end and an outer end, said piston defining:
      b.1 an inner sealing surface adapted for engagement with the inner valve seat;
      b.2 an outer sealing surface adapted for sealing engagement with the outer valve seat, with the surface area of said outer sealing surface being smaller than the surface area of said inner sealing surface; and
      b.3 at least one longitudinal flow path;
   (c) a first magnet incorporated into the inner end of the piston; and
   (d) a second magnet retained by a magnet holder incorporated into the inner valve body, with the first and second magnets being oriented to produce an attractive magnetic force between the first and second magnets, and with said magnet holder being configured to define at least one longitudinal fluid flow path;
such that:
   (e) the attractive force between the first and second magnets biases the piston toward a closed position with the inner end of the piston in sealing engagement with the inner valve seat, such that fluid flow through the valve assembly is prevented; and
   (f) a vacuum of sufficient strength applied to the outer end of the valve body will urge the piston out of sealing engagement with the inner valve seat, toward an open position in which fluid can flow outward through the valve via the longitudinal flow paths of the piston and the magnet holder, with the attractive force between the first and second magnets retaining a residual value effective to bias the piston toward the closed position when the vacuum strength drops.

2. A valve assembly as in claim 1, further comprising valve actuating means for manually actuating the valve.

3. A valve assembly as in claim 2 wherein the piston incorporates a camming member contiguous with the outer end of the piston, and wherein the valve actuating means comprises a valve stem engageable with the camming member so as to move the piston longitudinally within the bore of the main valve body.

4. A valve assembly as in claim 3 wherein the valve stem is a flat member extending transversely through the outer section of the outer valve body and through a rectilinear opening in the camming member, said valve stem being rotatable so as to engage the camming member.

5. A valve assembly as in claim 3 wherein a shear point is provided at the juncture between the camming member and the outer end of the piston.

6. A valve assembly as in claim 1 wherein the longitudinal position of the magnet holder relative to the valve body is adjustable.

7. A valve assembly as in claim 6 wherein the longitudinal position of the magnet holder relative to the valve body is adjustable by means of external threading on the magnet holder engageable with internal threading in the bore of the valve body.

8. A valve assembly as claim 1, further comprising a filter element adapted for connection to an inner end of the inner valve body, said filter element comprising a fluid inlet tube having a plurality of fluid inlet orifices and wrapped with a mesh screen.

9. A valve assembly as in claim 1 wherein the first and second magnets are rare earth magnets.

10. A valve assembly as in claim 1 wherein each of the inner and outer valve seats comprises a frustoconical surface and associated seal means.

11. A valve assembly as in claim 10 wherein the seal means comprises an O-ring.

* * * * *

UNITED STATES PATENT AND TRADEMARK OFFICE
CERTIFICATE OF CORRECTION

| | |
|---|---|
| PATENT NO. | : 8,668,183 B2 |
| APPLICATION NO. | : 13/432338 |
| DATED | : March 11, 2014 |
| INVENTOR(S) | : Peter G. Haseloh and Kirste Ann Manuel |

Page 1 of 1

It is certified that error appears in the above-identified patent and that said Letters Patent is hereby corrected as shown below:

Claims

Claim 1, Column 9:

Line 46, replace "smaller" with -- larger --.

Signed and Sealed this
Seventeenth Day of November, 2015

Michelle K. Lee
*Director of the United States Patent and Trademark Office*